United States Patent [19]

Whittemore

[11] Patent Number: 4,599,515

[45] Date of Patent: Jul. 8, 1986

[54] MODERATOR AND BEAM PORT ASSEMBLY FOR NEUTRON RADIOGRAPHY

[75] Inventor: William L. Whittemore, La Jolla, Calif.

[73] Assignee: GA Technologies Inc., San Diego, Calif.

[21] Appl. No.: 572,352

[22] Filed: Jan. 20, 1984

[51] Int. Cl.[4] .................................... G01T 3/00

[52] U.S. Cl. .................................... 250/390; 250/518.1

[58] Field of Search .................... 250/390.01, 390.02, 250/390.10, 518.1, 358.1, 359.1

[56] References Cited

U.S. PATENT DOCUMENTS

| | | | |
|---|---|---|---|
| 3,715,597 | 2/1973 | Hofmann et al. | 250/518.1 |
| 3,733,490 | 5/1973 | Roche | 250/84.5 |
| 3,836,785 | 9/1974 | Reifenschweiler | 250/501 |
| 3,846,636 | 11/1974 | Zehr et al. | 250/499 |
| 3,914,612 | 10/1975 | Cason, Jr. et al. | 250/499 |
| 3,925,676 | 12/1975 | Bigham et al. | 250/499 |
| 4,192,998 | 3/1980 | Azam | 250/502 |
| 4,266,132 | 5/1981 | Marshall, III | 250/359.1 |

FOREIGN PATENT DOCUMENTS 7534867 10/1977 France .

OTHER PUBLICATIONS

Wilson, Lester E., et al., "Neutron Radiography with a 2.5 MeV Van de Graaf Accelerator," High Voltage Engineering Corporation, Feb. 15, 1970.

High Voltage Engineering, Now NR, Neutroflux-N-R-Systems for Neutron Radiography, May, 1970.

Stokes, J., et al., "A New Accelerator-Based Neutron Radiography System", IRT 4611-019, IRT Corporation, Dec. 9, 1981.

*Primary Examiner*—Janice A. Howell

*Attorney, Agent, or Firm*—Fitch, Even, Tabin & Flannery

[57] ABSTRACT

A moderator and beam port assembly is designed particularly for use with an accelerator source of fast neutrons to provide a collimated beam of thermal neutrons directed toward an object position for neutron radiography. A central moderator of solid hydrogenous material, preferably high density polyethlene, having a high hydrogen density and substantially no neutron poisons, has a source cavity lying on the beam axis for supporting the source of fast neutrons adjacent the axis. To form a beam of thermal neutrons, a ring of neutron poison material is disposed outside the moderator to form an aperture symmetrically disposed about the axis. The moderator has an inner beam port cavity extending substantially symmetrically of the axis from the aperture substantially to the source cavity. A heavy metal shield just outside the poison ring stops gamma rays produced upon capture of neutrons by the moderator and ring material. The shielding has a diverging opening mating the aperture with the entrance to a divergent beam collimator symmetrically disposed about the axis. The collimator is formed of heavy metal and neutron poison. The assembly is housed in a container substantially filled with an hydrogenous neutron reflector. The assembly may provide more than one neutron beam at the same time with the same or different gamma ray content.

16 Claims, 9 Drawing Figures

MODERATOR AND BEAM PORT ASSEMBLY FOR NEUTRON RADIOGRAPHY

The present invention relates to neutron radiography and more particularly to a moderator and beam port assembly therefor for use with a source of fast neutrons to direct a beam of thermal neutrons toward an object position. Still more particularly the present invention relates to such moderator and beam port assembly for use with an accelerator neutron source for providing a collimated beam of thermal neutrons with a relatively uniform intensity distribution at the object position and with a variable component of focussed gamma rays.

It is common to perform neutron radiography by using a nuclear reactor as a source of neutrons. Such reactors provide very high intensities of thermal neutrons which may be used with a collimator to provide a collimated beam of thermal neutrons with relatively uniform intensity distribution for such radiography.

For many applications of neutron radiography, a reactor neutron source is not appropriate, and a simpler neutron source is used. Such sources operate with much less thermal neutron flux than nuclear reactors, and hence, care must be taken to utilize the available neutrons to the utmost while still providing acceptable quality in the resulting neutron beam. It is difficult to meet the needs for both relatively high intensity, acceptably low background, and relatively uniform intensity at the same time.

In one form of prior neutron radiography sources, a Van de Graff generator has been utilized to provide an accelerator source of neutrons by accelerating deuterons against a beryllium target to produce fast neutrons. Such neutron source was placed in the center of an unshielded tank of water for moderation to thermal neutrons, and a divergent collimator was formed of aluminum lined with cadmium to produce a thermal neutron beam for neutron radiography.

Another source that has been utilized is an isotopic source, californium-252, which emits neutrons of about 1 MeV and gamma rays. The neutrons were moderated by a block of hydrogenous material and passed through a cavity in the hydrogenous material. A lead shield disposed on the block at the end of the cavity had a matching hole which formed an aperture for gamma rays. The neutrons passed through a collimator formed of aluminum lined with lithium to an object position for the neutron radiography. As the neutron energy from the californium source was about 1.0 MeV, only about 1.5 feet of hydrogenous material was necessary to assure the containment of the fast neutrons.

The present invention provides a moderator and beam port assembly that may be used with an accelerator neutron source to provide a more intense yet better collimated and more uniform thermal neutron flux with lower background than has been previously obtained with accelerator or isotopic neutron sources. At the same time one form of the present invention provides a variable thermal neutron flux to gamma ray flux ratio. The invention further provides gamma ray shielding for the neutron radiography object. In one aspect of the present invention, the moderator and beam port assembly may be utilized to provide either a thermal neutron beam with a relatively low gamma ray component or a thermal neutron beam with a relatively high gamma ray component. In one form of the invention both may be provided at the same time from different ports.

The moderator and beam port assembly of the present invention is designed particularly for use with an accelerator source of fast neutrons to provide a collimated beam of thermal neutrons directed toward an object position for neutron radiography. Such accelerator source comprises a Van de Graff generator with a deuterium ion source and a drift tube down which deuterons are directed toward and against a beryllium target. The deuterons react with the beryllium according to the reaction $$Be\ (d, n)\ B$$

to produce neutrons of various energies, in particular of energies about 1.5, 2, 3.5 and 5 MeV. The beryllium target is disposed substantially centrally in an hydrogenous moderator which acts to moderate the energy of the neutrons by scattering. The neutrons are thereby thermalized in the central region, although some fast and epithermal neutrons remain and many, particularly those with the higher initial energies, escape the central region without being thermalized. Neutron capture gamma rays of 2.2 MeV are also produced in the process.

The moderator and beam port assembly of the present invention includes a central moderator of solid hydrogenous material, preferably high density polyethylene, having a high hydrogen density and substantially no neutron poisons. The moderator has a source cavity lying on the beam axis for disposing the source of fast neutrons (the beryllium target) adjacent the axis. The high concentration of hydrogen assures the highest concentration of thermal neutrons near the beam axis at the center of the moderator, and absence of neutron poisons assures that thermal neutrons once produced are not captured, attenuating the beam. High density polyethylene has a density of about 0.95 gm/cc and a hydrogen density 24% higher than that of water. The light carbon atoms have no bad effect. The result of using the preferred moderator has been that an extremely low moderator factor (MF) has been achieved, the moderator factor being defined as:

$$MF = S/\phi_M$$

where S is the number of source neutrons produced per second by the source, and $\phi_M$ is the highest source intensity of thermal neutrons available at any point in the assembly for use in the neutron radiography beam when the source is in operation. The moderating factor is thus an indication of the efficiency of the moderator in producing neutrons under operating conditions. A moderating factor less than 200 indicates a very efficient moderator. The assembly of the present invention has operated with a moderating factor of about 177.

To form a beam of thermal neutrons, a ring of neutron poison material is disposed outside the moderator to form an aperture symmetrically disposed about the beam axis. The moderator has an inner beam port cavity extending substantially symmetrically of the beam axis from the aperture substantially to the source cavity. Thus thermal neutrons entering the inner beam port cavity near the source and traveling in the direction of the aperture pass freely therethrough, whereas the thermal neutrons and epithermal neutrons having energies less than a predetermined energy and striking the ring of neutron poison material are stopped. A heavy metal (lead) shield just outside the poison ring stops gamma rays produced upon capture of the thermal and epithermal neutrons by the ring material. Such shielding also acts to stop the 2.2 MeV neutron capture gamma rays produced in the moderator. The shielding has a diverging opening mating the aperture with the entrance to a beam collimator.

The beam collimator forms an axial collimating cavity symmetrically disposed about the axis and extending intermediate the aperture and the object position. The collimator is formed of heavy metal (preferably lead) and neutron poison (preferably boron) mixed together to keep gamma rays and thermal neutrons from entering the beam from the collimator surfaces. The assembly is housed in a container which is substantially filled with an hydrogenous neutron reflector, e.g., normal density polyethylene, which acts to reflect neutrons and keep them inside the container and permits only a low level of fast neutrons to escape. A second heavy metal (lead) shield is disposed about the collimator to attenuate gamma rays from the reflector that might otherwise get into the beam.

The container is surrounded by concrete to stop or thermalize remaining neutrons exiting the container other than through the collimator. A neutron poison, preferably of borax, stops thermal neutrons exiting the wall except through the collimator.

The collimated thermal neutrons are directed through the object to be radiographed, and a neutron radiograph is formed, conventionally on a film, using a standard neutron converter such as foil formed of gadolinium.

The moderator and beam port assembly of the present invention is made more versatile by a number of easily made modifications. This permits a change in the relative number of gamma rays in the beam, as may be helpful in the radiography of objects made of certain materials.

These and other advantages, aspects and objects of the present invention will become evident from the following detailed description, particularly when taken in conjunction with the accompanying drawings.

Figure 2:
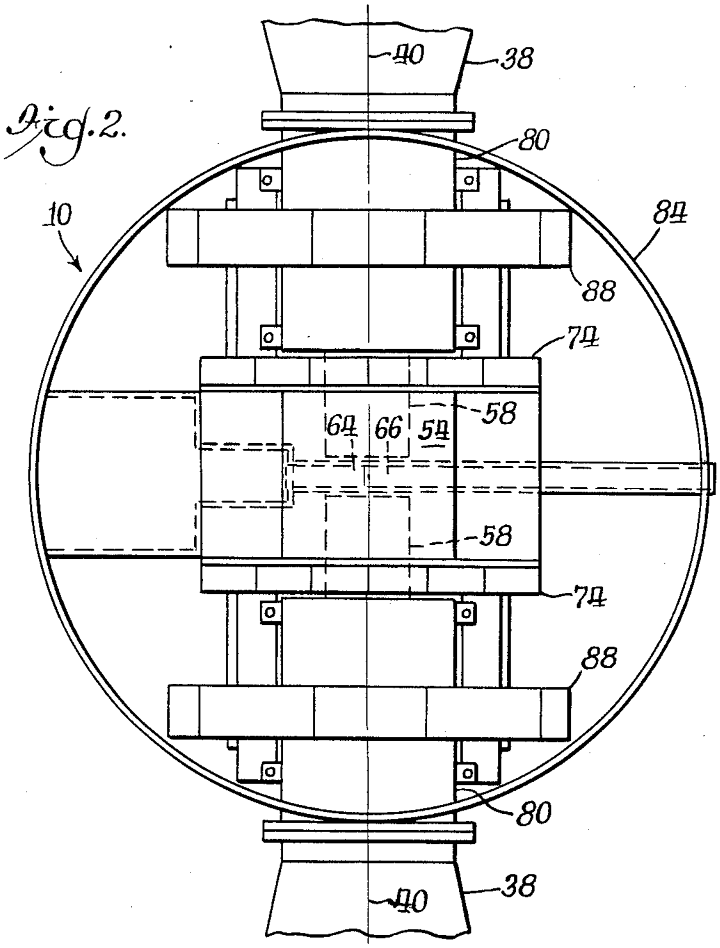
FIG. 2 is a plan view of the moderator and beam port assembly shown in FIG. 1, with the cover of the containment vessel and the neutron reflector removed.
Figure 3:
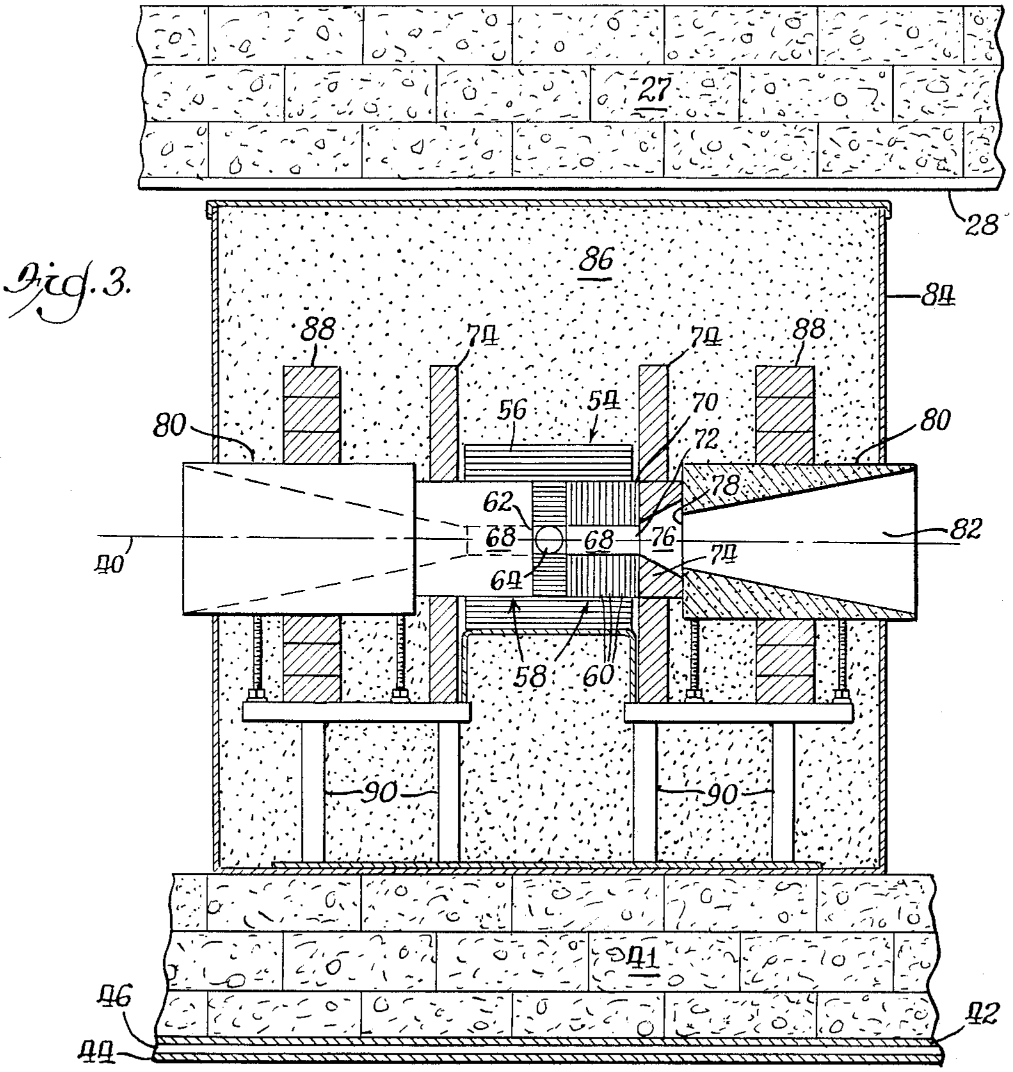
FIG. 3 is a vertical axial sectional view of the assembly shown in FIG. 2.
Figure 8:
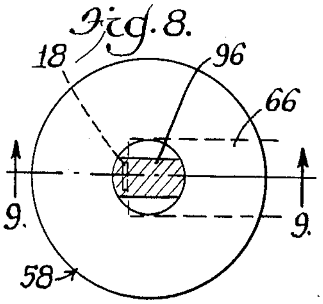
Figure 9:
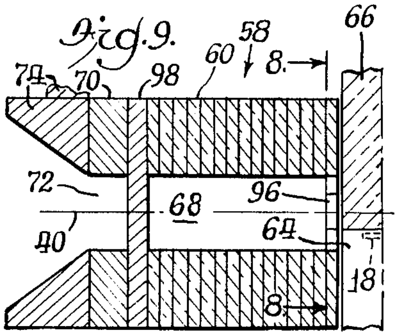

FIG. 8 is a vertical transaxial sectional view of a further alternative form of inner beam port useful in the assembly shown in FIGS. 2 and 3, taken along line 8—8 of FIG. 9; and FIG. 9 is a vertical axial sectional view of the inner beam port shown in FIG. 8, taken along line 9—9 of FIG. 8.

Figure 1:
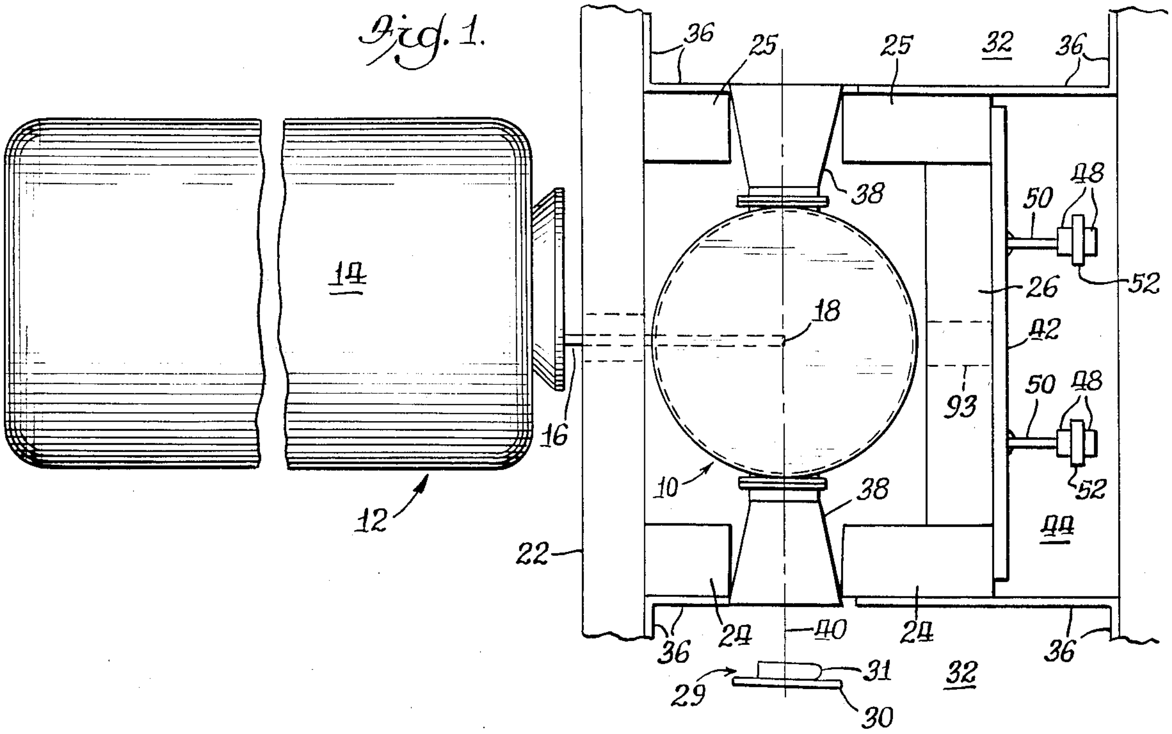
FIG. 1 is a plan view of a moderator and beam port assembly for neutron radiography in accordance with the present invention as used with a Van de Graff accelerator source of fast neutrons, with the top of the encasing concrete removed.

Shown in FIG. 1 is a moderator and beam port assembly 10 in accordance with the present invention as used with a Van de Graff accelerator system 12 that provides a source of fast neutrons. As shown in FIG. 1, the accelerator system 12 is formed of three parts, a Van de Graff accelerator and deuterium ion source 14, a drift tube 16 and a target 18. The particular accelerator system 12 as shown in the drawings and as used with a particular embodiment of the present invention, is a commercial accelerator source manufactured by High Voltage Engineering Corporation, Burlington, Mass., and sold as Model KNR-3000 for neutron radiography. It provides a beam of deuterons with an energy of 3 megavolts at a beam current of three microamperes, thus providing 900 watts on the target 18. Larger models are available and useful with a moderator and beam port assembly according to the present invention.

The Van de Graff accelerator and deuterium ion source 14 includes all of the appurtenant apparatus conventional for such systems. It includes the usual Van de Graff belt for conducting charge to a high potential terminal, with an appropriate drive for the belt, and appropriate insulators for the high voltage terminal. It includes an appropriate source of charge for charging the belt and means for removing the charge at the high voltage terminal. It includes means at the high voltage terminal for creating ions of deuterium. Such ions may be formed by introducing deuterium gas and ionizing the gas with radio frequency energy. The deuterium ions are, of course, positively charged deuterons, which are then electrostaticly accelerated from the positively charged high voltage terminal toward ground potential. The ions are formed into a beam electrically and/or magnetically and caused to pass into the drift tube 16.

The drift tube 16 forms a field-free region down which the deuterium ions move to strike the target 18. The drift tube 16 is evacuated by usual means. The drift tube 16 may include a bellows section and gimbals for moving the target end of the drift tube to locate the target 18 in proper relation to the deuteron beam.

The target 18 becomes the actual source of fast neutrons upon being bombarded by the deuterium ions and may be referred to as the target-source 18 or simply as the source 18. As noted above, the fast neutrons are produced by the reaction Be(d,n)B.

The target 18 forms substantially a point source of fast neutrons, and gamma rays are emitted therefrom as well. As noted above, the fast neutrons are of particular energies, namely, 1.5, 2, 3.5 and 5 MeV. The beryllium target 18 may be three quarters of an inch in diameter and thirty to forty mils thick, brazed to a copper plug at the end of the drift tube 16. As the three megavolt, 300 microampere deuteron beam generates 900 watts of power at the target, the drift tube includes appropriate coolant means outside the evacuated area for cooling the target lest it melt. Such coolant in the particular device is by the circulation of water in concentric tubes around and behind the target 18. Such water provides a certain amount of moderation of the neutrons right at the target.

As shown in FIG. 1, the drift tube 16 penetrates substantially to the center of the moderator and beam port assembly 10, where the target 18 is positioned. The assembly 10 is shielded by walls 22, 24, 25 and 26 and a ceiling 27 (FIG. 3), all of concrete blocks, the ceiling 27 being supported on steel plates 28 spanning the space between the walls 24, 25. The wall 22 separates the Van de Graff accelerator and deuterium ion source 14 from the moderator and beam port assembly 10. The walls 24 and 25 separate the assembly 10 from radiography rooms 32. The wall 26 shields the other side of the assembly 10. Further shielding of the rooms 32 is provided by layers 36 of neutron absorbing material, preferably borax. Attached to the moderator and beam port assembly 10 are collimator extensions 38 extending through the walls 24, 25 and the borax layers 36.

The moderator and beam port assembly 10 moderates the fast neutrons to thermal neutrons and produces a relatively collimated beam of thermal neutrons moving generally axially along a beam axis 40 from the center of the assembly 10 out through the collimator extension 38 toward an object position 29 in one of the rooms 32. In order to make a neutron radiograph a film cassette 30 is placed behind an object 31 to receive neutrons passing through the object. Where neutrons are scattered from the beam or are captured, fewer neutrons strike the film cassette. The film cassette is backed by some neutron reactive material, such as gadolinium, which upon the capture of thermal neutrons, emits electrons, half of which are scattered back upon the beam path to strike the film. As the film is sensitive to electrons but not neutrons, it then will indicate where there is a deficiency in neutrons reaching the gadolinium layer, thereby producing a neutron radiograph.

The assembly 10 and the walls 24, 25 and 26 are mounted on a concrete base 41 supported by a plate 42 which rests on the floor 44 of the room in which the assembly 10 is situated. The plate 42 is mounted on skids 46 (FIG. 3) for movement along the floor 44. Such movement is effected by the turning of nuts 48 on threaded rods 50, the rods being rigidly affixed to the plate 42 and the nuts acting against anchors 52 secured to the floor 44.

The moderator and beam port assembly 10 is shown in greater detail in FIGS. 2 and 3. The assembly 10 includes a moderator 54 located substantially centrally of the assembly 10. The moderator 54 is comprised of sheets or plates of high density polyethlene. The major portion of the moderator 54 is formed of horizontal sheets or plates 56, but additional moderator material is provided in inner beam port assemblies 58 which are formed of vertical sheets or plates 60 of high density polyethlene in doughnut shapes. The center of the moderator 54 includes a block 62 of high density polyethlene that has been bored to create a central source cavity 64 which is of such diameter as to accommodate the drift tube 16 with the beryllium target 18 at the end thereof. Horizontal movement of the moderator and beam port assembly 10 by operation of the nuts 48 positions the target source 18 laterally in the source cavity 64 relative to the inner beam port assemblies 58. An hydrogenous rod 66, also preferably of high density polyethlene, is inserted into the source cavity 64 from the end opposite that of the drift tube 16 to provide additional moderator material near the center of the moderator 54. The total high density hydrogenous material of the moderator is at least about 1 cubic foot arranged more or less symmetrically about its center, about where the source 18 is located. The moderator material acts upon the fast neutrons produced at the beryllium target to thermalize such neutrons and produce a cloud of thermal neutrons centrally of the moderator 54.

The assembly 10 includes two inner beam port assemblies 58, although more may be used and one is useful. Each beam port assembly 58 includes an inner beam port cavity 68 defined by the doughnut shaped sheets 60. The cavity 68 is coaxial with the axis 40 and is circularly symmetrical about the axis. Preferably the cavity extends to the block 62, but may be otherwise closed by moderator material.

A ring 70 of neutron poison material is disposed outside the moderator 54 at the distal end of each of the inner beam port assemblies 58. Each ring 70 is formed of one or more neutron poisons. In a particular assembly actually built and tested, the neutron poisons of the poison ring 70 include boron, cadmium, dysprosium, indium and gadolinium. Certain of these materials have neutron capture cross sections varying simply as 1/v, where v is neutron velocity, whereas others have in addition certain resonances for neutron capture in the epithermal region. The object and effect of such poison material is to capture substantially all of the slow neutrons and epithermal neutrons that strike the rings 70 up to some predetermined neutron energy limit. The rings 70 define apertures 72 circularly symmetrically about the axis 40 and acting to define the neutron beam. Thus, as stated above, the thermal neutrons entering the inner beam port cavity 68 near the source 18 and travelling generally axially, pass freely through the apertures 72; whereas, the thermal neutrons and epithermal neutrons having energies less than the predetermined energy and striking the ring 70 are stopped.

A lead shield 74 just outside the ring 70 stops gamma rays produced upon the capture of thermal and epithermal neutrons by the material of the ring 70. The shields 74 have shaped openings 76 mating the apertures 72 with the entrance 78 of respective beam collimators 80.

The beam collimators 80 are preferably of substantially rectangular cross section in planes perpendicular to the beam axis 40 and are symmetrically disposed about this axis. The collimators 80 are formed of aluminum containers filled with a mixture of lead shot and boron frit. The inner walls of the containers define axial collimating cavities 82 symmetrically disposed about the axis 40 and extending intermediate the respective apertures 72 and object positions 29. The boron acts to attenuate thermal neutrons which otherwise might enter the collimating cavities 82, and the lead acts to keep gamma rays out of the cavities. The boron acts not only to inhibit the passage of neutrons from the source through the moderator 54 to the cavities but also acts to stop neutrons that are returning from outside the assembly 10 and entering the outer ends of the cavities as by reflection from the objects 31 being radiographed.

The assembly 10 is contained in a container 84. The open space in the container 84 not otherwise filled with structural materials is filled with an hydrogenous neutron reflector 86, which may be made of normal density polyethlene. The reflector 86 reflects neutrons and keeps them inside the container 84 to a considerable degree. Fast and epithermal neutrons are further thermalized in the reflector 86. This thermalization process does, however, result in the production of 2.2 MeV neutron capture gamma rays, as stated above. These gamma rays plus those from the moderator 54 are attenuated by the lead shield 74. Some are also attenuated by the lead in the collimators 80. In addition, a second lead shield 88 is disposed about each of the beam collimators 80 to further attenuate gamma radiation produced in the reflector 86 to keep such gamma rays out of the collimating cavities 82. Supporting structures 90 support the moderator 54, poison rings 70, lead shields 74 and 88 and collimators 80 within the container 84 at appropriate heights in respect to the drift tube 16.

Any neutrons escaping through the walls of the container 84 are moderated by the walls 22, 24, 25 and 26, the base 41 and the ceiling 27, and thermal neutrons leaking through the walls 24 and 25 are stopped by the borax layers 36. The walls, floor and ceiling also act to stop stray gamma rays.

The inner walls of the collimators 80 are formed of flat aluminum pieces diverging in the direction of the object positions 29, whereby the collimating cavities 82 provide lines of sight from substantially all points therein through the respective apertures 72 to points at the source end of the respective inner beam port cavities 68. This provides flatness to the neutron intensity distribution over the object positions 29. Because of the reflecting and moderating properties of the moderator 54, the thermal neutrons appear to be coming primarily from a region near but not entirely at the fast neutron target-source 18. The thermal neutrons forming the beams arise from polyethlene surfaces in the inner beam port cavities. Some arise at the very end, some arise along the sides of the cavities. The thermal neutrons are diffusing into the cavities, mostly near the center of the moderator 54. By appropriate positioning of the moderator 54 and the target 18 relative to one another and relative to the axis 40, an appropriate distribution of thermal neutrons at the source end may be created, whereby looking at such source end from an object position 29, one sees a relatively uniform distribution of neutrons. Because neutrons do not readily leave surfaces parallel thereto, the part of a neutron beam on the beam axis 40 does not receive as many neutrons from the sides of the inner beam port cavity 68 as those parts of the beam that are off axis. On the other hand, the central part of the beam receives the major component of its neutrons right down the center from the strongest part of the source with a smaller contribution from the sides. This provides a flatter distribution of neutrons.

Various ways of adjusting the thermal neutron distribution as well as the relative gamma ray content of the beam are provided. One scheme would be to place a doughnut shaped plate 60 of smaller internal diameter at the source end of a beam port cavity 68. This additional high density polyethlene at that position provides some increase in the production of thermal neutrons near the cavity, although at the same time it attenuates thermal neutrons arriving from some distance from the cavity. Particular arrangements will depend upon the particular geometry desired. In general the moderator 54 is at least of the order of one cubic foot of high density polyethlene with the rings 70 outside the moderator. Substantially no poison material is permitted within the moderator 54.

Figure 4:
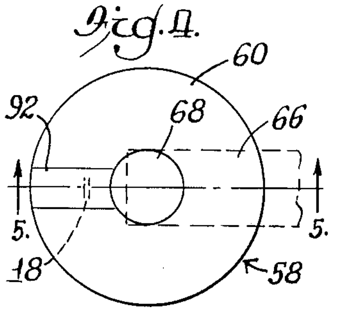
FIG. 4 is a vertical transaxial sectional view of one form of inner beam port useful in the assembly shown in FIGS. 2 and 3, taken along line 4—4 of FIG. 5.
Figure 5:
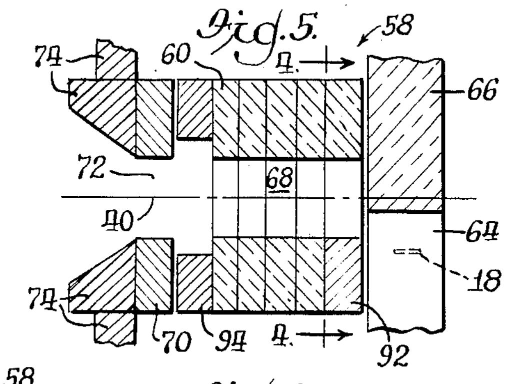
FIG. 5 is a vertical axial sectional view of the inner beam port shown in FIG. 4, taken along line 5—5 of FIG. 4.

Certain arrangements for providing different beam conditions are illustrated in FIGS. 4 to 9. In FIGS. 4 and 5 is illustrated an inner beam port assembly 58 for providing minimum gamma rays in the neutron beam. This results in some attenuation of the neutron beam from what would otherwise be possible, but it does eliminate the gamma rays to a considerable extent and hence makes a somewhat different and frequently preferred radiograph from what would be achieved were more gamma rays present in the beam. Unfocussed gamma rays may obscure the radiograph in some instances. In this arrangement the beryllium target 18 is positioned one and a half inches from the axis 40. This is done by moving the beam port assembly 10 relative to the accelerator source 12 by use of the nuts 48. The inner beam port cavity 68 is two inches in diameter adjacent the source cavity 64. The target 18 is thus withdrawn behind the vertical sheets 60 one-half inch. A lead coupon 92 is placed in the sheet 60 nearest the source 18 to obscure the target 18. This keeps a major fraction of the gamma rays from the source 18 from entering the cavity 68 and hence the beam. The rod 66 is inserted beyond the axis 40 to supply moderating material near the target-source 18, however not so near as to obscure entirely the inner beam port cavity 68. The rod 66 may be positioned through an access port 93 in the wall 26. A doughnut shaped lead shield 94 is disposed at the distal end of the inner beam port cavity 68 to further attenuate gamma rays that might otherwise enter the beam.

Figure 6:
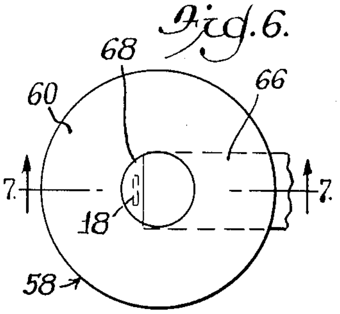
FIG. 6 is a vertical transaxial sectional view of an alternative form of inner beam port useful in the assembly shown in FIGS. 2 and 3, taken along line 6—6 of FIG. 7.
Figure 7:
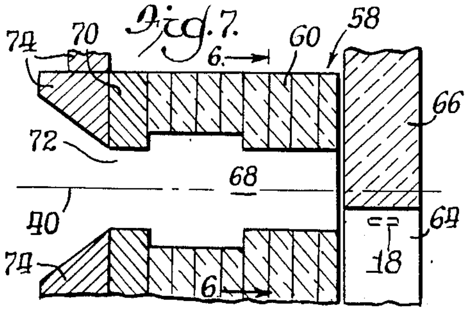
FIG. 7 is a vertical axial sectional view of the inner beam port shown in FIG. 6, taken along line 7—7 of FIG. 6.

In FIGS. 6 and 7 is illustrated an inner beam port assembly 58 for producing substantially increased slow neutron content but with a consequent maximum, highly focussed, gamma ray component. Sometimes such gamma rays in the neutron radiography beam may merely be tolerated; other times they may provide a positive benefit. In this form of assembly, the target 18 is placed about ½ inch from the beam axis 40, and the rod 66 is moved as close to the target 18 as is physically possible. The inner beam port cavity 68 is not entirely obscured by the rod 66, so that slow neutrons from the target 18 and from behind the target 18 may enter the cavity 68. At the same time, placing the rod 66 over the axis 40 and closely adjacent the target source 18 creates a large cloud of thermal neutrons at or near the axis 40, helping to concentrate the thermal neutrons near the axis and providing a larger thermal neutron flux in the beam. In this form of the invention, the vertical doughnut shaped sheets 60 have a larger internal diameter at the distal end than at the source end, providing appropriate thermal neutron intensity distribution at the object position 29.

In FIGS. 8 and 9 is illustrated an embodiment whereby neutron beams of maximum and minimum gamma ray content may be provided simultaneously. That is, an inner beam port assembly 58 as shown in FIGS. 8 and 9 may be utilized for one of the beam port assemblies, and a beam port assembly 58 as illustrated in FIGS. 6 and 7 may be utilized for the other. The beam port assembly 58 as shown in FIGS. 8 and 9 has the beryllium target 18 and the rod 66 positioned just as in the case of the beam port assembly illustrated in FIGS. 6 and 7, as is necessarily the case because the same target and rod are used for both beam ports at the same time. However, in order to reduce the gamma ray content in the inner beam port cavity 68 illustrated in FIGS. 8 and 9, a lead coupon 96 is placed across the inner vertical sheet 60 in such manner as to obscure the beryllium target 18 when viewed from the distal end of the collimator, thereby attenuating gamma rays from the target source 18. In addition, as shown in FIG. 9, a filter 98 of bismuth composed of a single crystal or at most a few crystals may be placed at the distal end of the inner beam port assembly 58 to attenuate gamma rays further. It also attenuates higher energy neutrons more than it attenuates thermal neutrons. Hence this purifies the beam in respect to thermal neutrons without too much loss of intensity.

Other beam port assemblies may be utilized within the scope of the present invention, and other variations may be made in the moderator and beam port assembly without departing from the scope of the invention. For example, a vertical doughnut shaped sheet 60 of lesser inner diameter may be used as the sheet nearest the source to provide additional moderating material where it is most useful and to provide an effective source of thermal neutrons for the beam while still permitting the escape of slow neutrons from the source side of such sheet. As examples of other configurations of moderator and beam port assemblies, the drift tube may enter other than horizontally, and the neutron beams may exit other than horizontally and other than normal to the source cavity.

The described embodiments of the moderator and beam port assembly have been built and tested and have demonstrated certain advantages over the moderator and beam port assemblies of the prior art. A moderator 54 of at least about one cubic foot of high density polyethylene substantially uniformly placed around the fast neutron target-source 18 is an optimum moderator for providing a dense cloud of thermal neutrons centrally thereof. Specifically it has demonstrated a moderating factor of 177 under operating conditions. There is substantially no neutron poison within the moderator. The poison rings 70 are outside the moderator 54 and hence spaced from the center thereof sufficiently to have substantially no effect upon the peak flux $\phi_M$.

The side walls of the inner beam port cavities 68 act as secondary ring sources of thermal neutrons. Their shape and the disposition of the target 18 and the rod 66 relative thereto assist in flattening the thermal neutron intensity distribution at the object positions 29. The rings 70 capture the neutrons up to a predetermined epithermal energy except for those leaving the cavities 68 through the apertures 72. The first and second lead shields 74, 88 keep gamma rays out of the beam other than those passing through the apertures 72 to the respective collimating cavities 82. The apertures 72 thus clearly define the size of the source of the neutron radiography beam in respect to both neutrons and gamma rays. The apertures may be changed to change the effective diameter D of the beam.

The collimators 80 are preferably of rectangular cross section, most preferably square, to provide appropriate shielding as near to the desired beam as possible without requiring an unnecessarily large amount of collimating material. The collimating cavities 82 are symmetrically disposed about the axis 40 for best efficiency and flattest neutron intensity distribution in the beam at the object positions 29. The collimating cavities 82 diverge in straight lines in the direction of the object positions 29 so that the collimating cavities provide a line of sight from substantially any point therein through the respective apertures 72 to a point at the source end of the respective inner beam port cavity 68. The collimators 80 are well outside the moderator 54, and hence the boron therein does not poison the effective source of thermal neutrons within the respective inner beam port cavities 68. The collimators 80 with the respective apertures 72 thus well define respective beams of thermal neutrons, with gamma rays as well, if desired.

The degree of focus of the beam may be measured by L/D, where D is the diameter of the aperture 72 and L is the distance of an object position 29 from the effective source of thermal neutrons. In the illustrated design, L/D was less than 20 for the closest object position 29, i.e., right at the exit from a collimator extension 38.

Moving the object position 29 further away improves focussing at the expense of beam intensity and hence the time needed for providing suitable contrast in the neutron radiograph. As there is no cadmium in the collimators 80, the collimator walls do not act as sources of parasitic unfocussed gamma rays.

The different inner beam port assemblies 58, as shown in the respective figures, and the ability to vary the position of the target 18 with respect thereto provides different modes of operation, e.g., either high or low gamma modes or both at once from different apertures. In the low gamma mode illustrated in FIGS. 4 and 5 no heavy metal is needed in the beam path to provide excellent neutron beam quality. In the high gamma mode illustrated in FIGS. 6 and 7 a filter of bismuth composed of a single crystal or at most a few crystals placed as shown in FIG. 9 may be used to control the relative content of beam gamma rays with a minimum loss of neutron intensity. Such filter may also be used to control relative epithermal neutron content of the beam, as thermal neutrons are less attenuated by such filter.

The large diameter of the reflector 86 assures that background leakage is reduced to an amount readily stopped by the walls 22, 24, 25 and 26, the ceiling 27, the base 41 and the adjacent layers 36 of borax.

What is claimed is:

1. A moderator and beam port assembly for use with a source of fast neutrons to provide a beam of thermal neutrons directed generally along an axis toward an object position for neutron radiography, said assembly comprising a moderator formed of solid hydrogenous material, said moderator having a source cavity lying on said axis, means for supporting said source of fast neutrons adjacent said axis, said material having a high hydrogen density and substantially no neutron poisons and substantially surrounding said source cavity for thermalizing fast neutrons from said source within said moderator without substantial capture of the resulting thermal neutrons, aperture means containing neutron poisons outside said moderator for capturing substantially all neutrons striking said aperture means having energies less than a predetermined epithermal energy and for forming and defining an aperture disposed about said axis outside said moderator, said moderator having an axial inner beam port cavity therein extending about said axis axially from said aperture substantially to said source cavity for permitting thermal neutrons to escape from said moderator through said aperture, a collimator forming a generally axial collimating cavity symmetrically disposed about said axis and extending intermediate said aperture and said object position and diverging in straight lines in the direction of said object position, said collimator being composed of heavy metal and neutron poison and being axially spaced from said aperture, first heavy metal shielding disposed axially between said collimator and said aperture for attenuating gamma rays arising from neutron capture in said moderator and said aperture means, said first heavy metal shielding having an axial opening providing substantially clear passage between said aperture and the proximal end of said collimating cavity, neutron reflector means of hydrogenous material disposed about said moderator and said first heavy metal shielding for further moderating neutrons escaping from said moderator and reflecting neutrons back toward said moderator, and second heavy metal shielding means for attenuating gamma rays arising from neutron capture in said neutron reflector means.

2. A moderator and beam port assembly according to claim 1 wherein said first shielding matches said aperture means to said collimator for attenuating radiation from said aperture means in the direction of said collimator while freely passing radiation passing through said aperture in the direction of said collimating cavity.

3. A moderator and beam port assembly according to claim 1 wherein said collimating cavity provides a line of sight from substantially any point therein through said aperture to a point at the source end of said inner beam port cavity.

4. A moderator and beam port assembly according to claim 3 wherein said first shielding matches said aperture means to said collimator for attenuating radiation from said aperture means in the direction of said collimator while freely passing radiation passing through said aperture in the direction of said collimating cavity.

5. A moderator and beam port assembly according to claim 1 wherein said aperture and inner beam port cavity are of circular transverse section and symmetrically disposed about said axis.

6. A moderator and beam port assembly according to claim 5 wherein said collimating cavity provides a line of sight from substantially any point therein through said aperture to a point at the source end of said inner beam port cavity.

7. A moderator and beam port assembly according to claim 6 wherein said first shielding matches said aperture means to said collimator for attenuating radiation from said aperture means in the direction of said collimator while freely passing radiation passing through said aperture in the direction of said collimating cavity.

8. A moderator and beam port assembly according to any one of claims 1 to 7 wherein said means for supporting comprises means for adjusting the location of said source of fast neutrons relative to said axis.

9. A moderator and beam port assembly according to any one of claims 1 to 7 wherein said moderator has a moderating factor at said source cavity of less than 200 under operating conditions.

10. A moderator and beam port assembly according to claim 9 wherein said moderator is formed of at least about one cubic foot of high density polyethylene.

11. A moderator and beam port assembly according to claim 10 further comprising a container containing said moderator, aperture means, collimator, and first and second shieldings and otherwise substantially filled with the hydrogenous material forming said reflector means out to at least about two feet from the center of said moderator.

12. A moderator and beam port assembly according to any one of claims 1 to 7 wherein said collimator is of substantially rectangular cross section in the planes perpendicular to the beam axis and is symmetrically disposed about said axis.

13. A moderator and beam port assembly according to any one of claims 1 to 7 wherein said heavy metal of said collimator is lead and said neutron poison of said collimator is boron, and said lead and boron are distributed substantially throughout said collimator.

14. A moderator and beam port assembly according to any one of claims 1 to 7 wherein said moderator forms two said inner beam port cavities, said assembly comprises aperture means and collimators for respective said inner beam port cavities, and wherein a heavy metal insert is mounted in one of said inner beam port cavities adjacent said source cavity to obscure a limited portion of said inner beam port cavity against transmission of gamma rays from said source through the respective said aperture.

15. A moderator and beam port assembly according to any one of claims 1 to 7 wherein said source cavity is spaced from said axis and said means for supporting supports said source within the cross section of said inner beam port cavity as viewed through said aperture.

16. A moderator and beam port assembly according to any one of claims 1 to 7 wherein said source cavity is spaced from said axis and said means for supporting supports said source outside the cross section of said inner beam port cavity as viewed through said aperture, and a third heavy metal shielding is provided adjacent said source for substantially obscuring said source as viewed through said aperture without substantially obscuring said inner beam port cavity as viewed through said aperture.

* * * * *